W. V. HOLLEY.
SERVICE WAGON.
APPLICATION FILED MAR. 9, 1920.
1,427,388.
Patented Aug. 29, 1922.
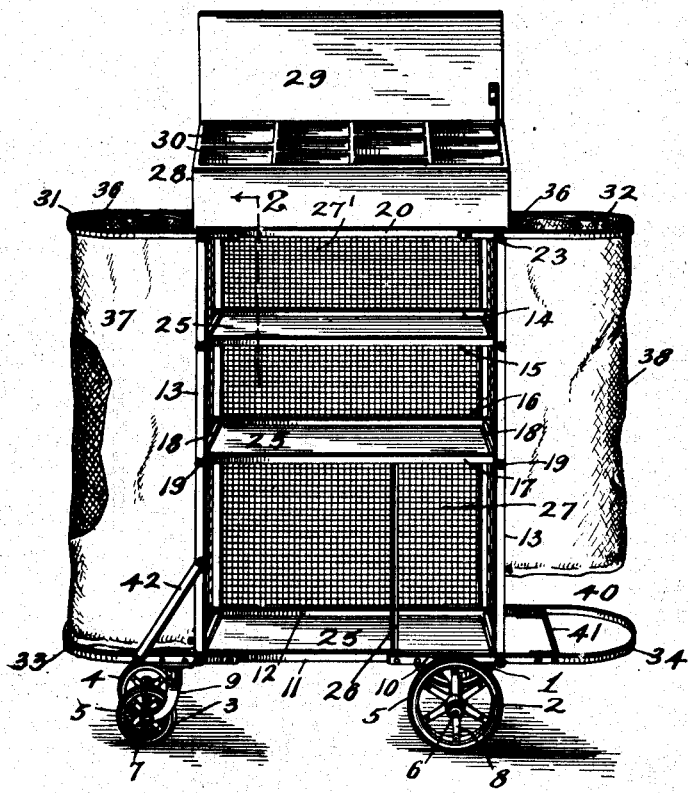
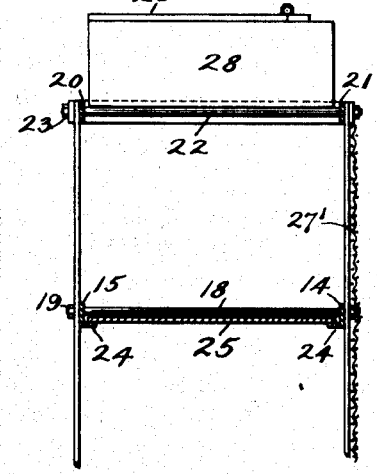
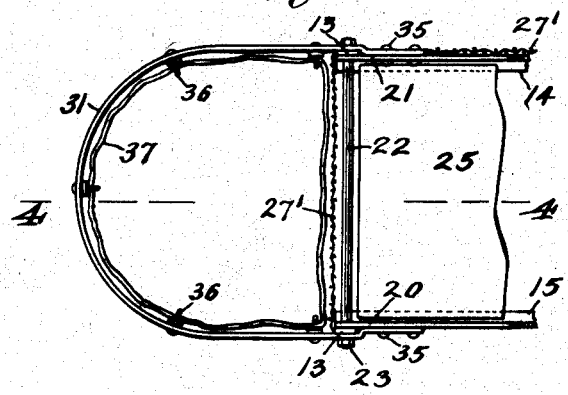
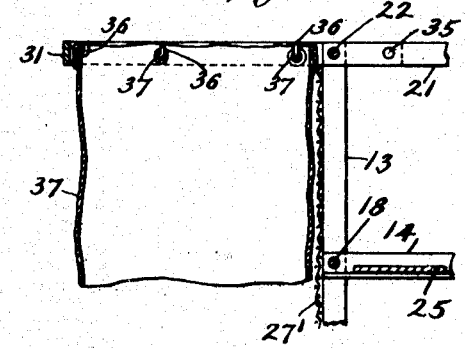
Inventor:
William V. Holley
By his Attorneys:
Phillips Sawyer Rice Kennedy

UNITED STATES PATENT OFFICE.

WILLIAM V. HOLLEY, OF NEW YORK, N. Y., ASSIGNOR TO NEW YORK BATH MANUFACTURING CO., A CORPORATION OF NEW YORK.

SERVICE WAGON.

1,427,388.                    Specification of Letters Patent.      Patented Aug. 29, 1922.

Application filed March 9, 1920. Serial No. 364,587.

*To all whom it may concern:*

Be it known that I, WILLIAM V. HOLLEY, a citizen of the United States, residing at New York, county of New York, and State of New York, have invented certain new and useful Improvements in Service Wagons, fully described and represented in the following specification and the accompanying drawings, forming a part of the same.

This invention relates to certain improvements in service wagons of the type commonly known as maids' wagons, used in hotels, hospitals and the like places.

These service wagons are generally mounted on rollers or casters so as to be readily moved around the halls and rooms in which they are to be used and to carry the articles required by the attendants in making up rooms.

It is the especial object of the present invention to improve these service wagons and to produce a service wagon which will be provided with compartments for carrying towels and other necessary linens, and with receptacles for carrying small articles, such as soap, electric light bulbs, pens, ink and writing paper, etc., and also receptacles for carrying soiled linen and waste paper, the compartments and receptacles used for these different purposes being readily removable so that both them and the supporting frames of the wagon itself may be readily cleaned, thus producing a very sanitary structure.

A further object of the invention is to produce a structure, the various removable parts of which are so supported that they may be easily and quickly removed for cleaning purposes, which shall be simple, cheap to construct and durable.

With these and other objects not specifically referred to, the invention consists in certain novel combinations and arrangements of parts, which will be described in detail in connection with the accompanying drawings and specifically pointed out in the claims hereunto annexed.

In the drawings:—

Figure 1 is a perspective side view of the improved service wagon, certain parts being broken away to show the construction.

Figure 2 is a detail view on the line 2—2 of Fig. 1, partly broken away and partly in section showing the means for supporting the removable trays.

Figure 3 is a detail plan view of part of the construction shown in Fig. 1.

Figure 4 is a detail broken section taken on line 4—4 of Fig. 3.

Referring now to these drawings in detail, the improved wagon may be made of any suitable material, as iron, steel, wood, or fibre board, as desired. In the particular construction illustrated, the whole wagon is mounted on a pair of wheels 1, 2 and a pair of caster wheels 3, 4, these caster wheels being preferably smaller than the wheels 1, 2, so as to make the wagon steer more easily, as it is moved round. The wheels and the casters may be provided with rubber tires 5, and are connected by axles 6, 7, and may be provided with the usual spokes 8.

Mounted on these wheels are supports 9, 10, from which the main body of the service wagon is supported. As illustrated, there is provided a pair of angle bars 11, 12, on each side which are suitably bolted or otherwise secured to the supports 9, 10. From these angle bars rise at each end of the wagon uprights in the form of spaced bars 13 and supported in these uprights are pairs of angle bars 14, 15 and 16, 17. These angle bars, as well as the angle bars 11, 12, are tied together and secured to the uprights by means of cross rods 18 and nuts 19, this making a firm and rigid structure. At the top of the upright is further provided a pair of bars 20, 21, which may be unflanged as shown connected with the uprights 13 by tie rods 22 and nuts 23, as shown in Fig. 2. The angle bars 11 to 17, inclusive, are formed with flanges 24, which are shown in Fig. 2, and which act as a support on which rest trays 25, these trays being removable from the supports by simply lifting them out so that they can be cleaned and the supports left open for access for cleaning likewise.

These trays form shelved compartments for carrying sheets, pillow cases, towels, etc., the shelves being spaced at any required or desired distance from each other, depending on the articles to be carried. If desired, one of the compartments, as the lower one, may be sub-divided by a removable partition 26, to form a further compartment 27, in which may be placed a pail or other cleaning utensil.

The back and ends of the wagon between the end uprights is preferably covered with a net, as the wire mesh shown at 27', to prevent articles being taken from the shelves by unauthorized persons when the wagon is standing in front of the door of a room.

In wagons constructed in the preferred manner, there is also provided a box or casing 28 supported on the tie rods 22, above referred to, so that it can be readily lifted off, this box or case having a cover 29, and being provided with small removable partitions 30, which are removable and interchangeable to form small compartments for carrying articles, such as soap, electric light bulbs, pens, etc.

The wagon is provided preferably at each end with upper curved frames or supports 31, 32, and similar lower curved frames or supports 33, 34. The frames or supports 31, 32, are secured to the upper rods 22 and bars 20 in any suitable manner, as by rivets 35, as shown in Fig. 3, and the outer ends of the supports are curved so that there will be no corners to strike and injure the walls or furniture, the wagon, because of the shape of these frames tending to slide away from the walls or furniture if accidentally it is brought into contact therewith.

The upper frames 31, 32, are provided with means for supporting removable receptacles for soiled linen and paper, as bags 37, 38. While these means may be varied somewhat, in the preferred construction, the frames are formed with hooks 36 over which are adapted to pass grommets 39, by which the bags may be readily secured to and removed from the hooks. One of these bags, as 37, is intended for soiled linen and the other bag, as 38, for waste paper.

In service wagons embodying the invention in its best form, means will be provided for carrying a vacuum cleaner, carpet sweeper, or similar articles. While the means for effecting this may be somewhat varied, as illustrated, one of the bags, as bag 38, does not extend all the way down to the support 34, but a space 40 is left so that a cleaner or other article may rest on the frame 34, a cross frame 41 being provided for strengthening the frame 34 and forming an additional support for any article that may be placed thereon. Side braces 42, one of which is shown, may be provided secured to the frame 33, and the uprights 13, before referred to, for providing a strong and rigid construction.

In the construction shown and described a very rigid wagon has been provided, and one which may be easily moved about and in which the receptacles may be all readily removed for the purpose of cleaning, thus effecting a very sanitary construction. While the wagon is shown and described in its preferred form, it will be understood that variations in the specific construction and arrangement of the parts may be made without departing from the invention.

What I claim is:

1. A service wagon having a wheeled box-like frame and extension frames having curved outer sides secured to the respective ends of the frame and extending in the direction of travel of the wagon, and receptacles removably secured to the extension frames and depending therefrom.

2. A service wagon having an open box-like frame comprising end uprights and side and end bars and a wheeled supporting base, upper and lower extension frames having curved outer sides secured to the uprights at each end, and receptacles removably secured to the extension frames at each end and depending therefrom, one of the receptacles being shaped to leave a space between its bottom and the frame beneath it to provide a space in which a utensil may be supported.

3. A service wagon having a frame comprising end uprights, a base, and wheels for supporting the base, upper and lower curved members extending outwardly from the uprights beyond the wheels at each end, a receptacle removably secured to the upper member at one end and depending therefrom and shaped to leave a space between its bottom and the curved member beneath it to provide a space in which a utensil may be supported.

In testimony whereof, I have hereunto set my hand.

WILLIAM V. HOLLEY.